United States Patent [19]

Heintz

[11] Patent Number: 4,891,941
[45] Date of Patent: Jan. 9, 1989

[54] FREE PISTON ENGINE-PUMP PROPULSION SYSTEM

[76] Inventor: Richard P. Heintz, 1841 Oakland Dr., Kalamazoo, Mich. 49008

[21] Appl. No.: 226,622

[22] Filed: Aug. 1, 1988

[51] Int. Cl.⁴ .............................................. F16D 31/02
[52] U.S. Cl. ........................................ 60/416; 60/417; 60/487; 180/165; 180/307
[58] Field of Search ................. 60/413, 416, 417, 418, 60/487; 180/165, 307, 308

[56] References Cited

U.S. PATENT DOCUMENTS

| | | | |
|---|---|---|---|
| 4,098,144 | 7/1978 | Besel et al. | 180/165 X |
| 4,215,545 | 8/1980 | Morello et al. | 60/416 X |
| 4,741,410 | 5/1988 | Tunmore | 180/307 X |
| 4,760,697 | 8/1988 | Heggie et al. | 180/165 X |
| 4,813,510 | 3/1989 | Lexen | 180/307 X |

FOREIGN PATENT DOCUMENTS 900056   1/1982   U.S.S.R. ................ 60/416

Primary Examiner—Edward K. Look
Assistant Examiner—Mark A. Williamson
Attorney, Agent, or Firm—Flynn, Thiel, Boutell & Tanis

[57] ABSTRACT

A stored energy-type propulsion system for a vehicle employing a free piston engine-pump hydraulically connected to a drive motor, which in turn connects to the vehicle wheels. The hydraulic connection between the engine-pump and the drive motor includes a large-capacity pressure accumulator which is normally isolated from the system, and which is opened for communication with the system to supply pressure fluid to the drive motor only under conditions demanding peak operating pressure for limited time durations. An auxiliary accumulator of significantly smaller capacity is also connected to the hydraulic connection. This auxiliary accumulator is normally in open communication with the hydraulic connection to function as a cushion to minimize pressure fluctuations so that the system can operate in an ON-OFF cycle whereby the engine-pump can run for a large number of pumping cycles during the "ON" part of the cycle, and then be stopped for an equivalent number of cycles during the "OFF" part, during which the auxiliary accumulator is capable of driving the drive motor at the steady-state vehicle condition. The auxiliary accumulator can be immediately isolated from the hydraulic connection so that the system can respond to a sudden demand for increased power, such as due to a significant depression in the vehicle accelerator pedal.

2 Claims, 2 Drawing Sheets

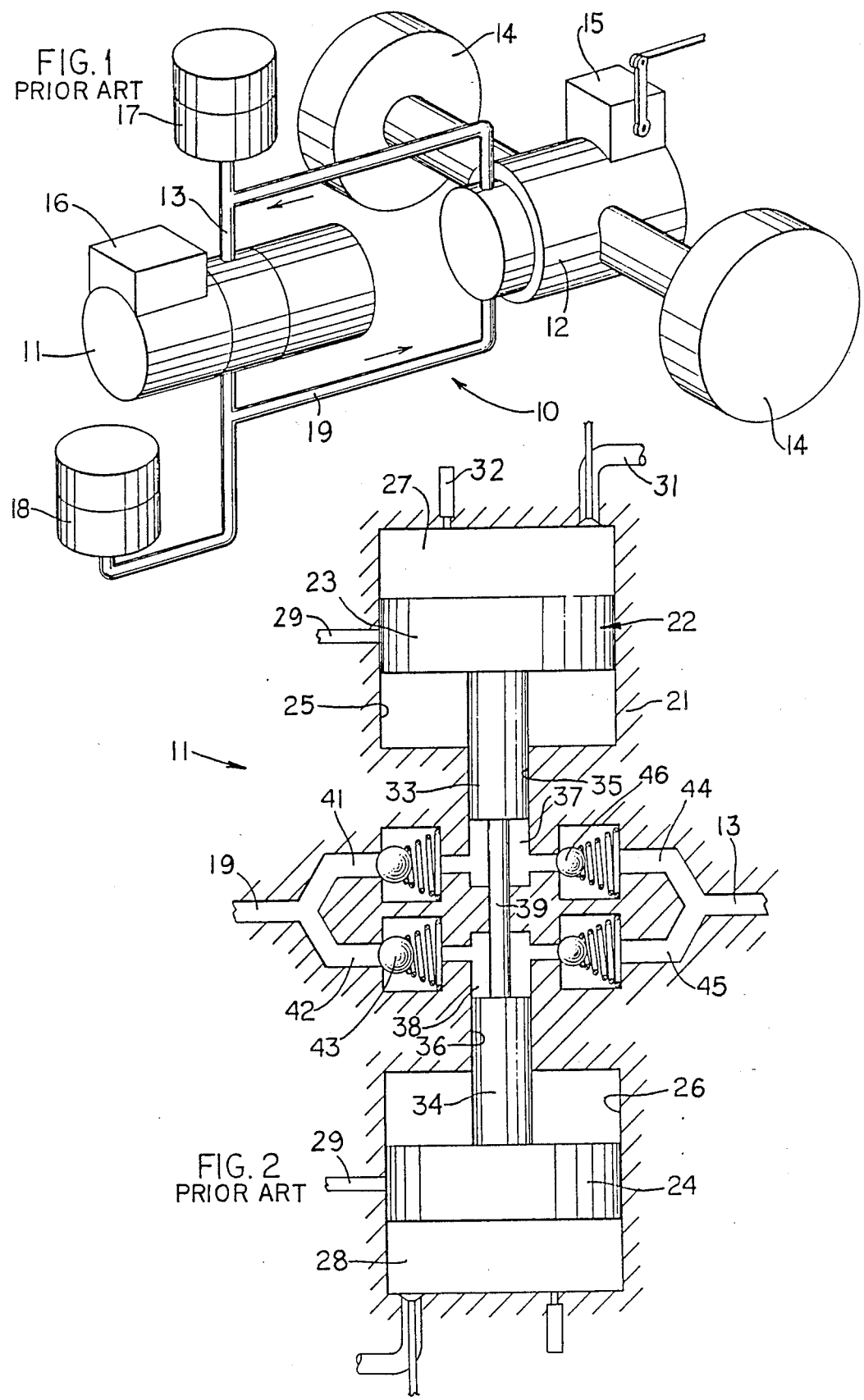

FREE PISTON ENGINE-PUMP PROPULSION SYSTEM

FIELD OF THE INVENTION

This invention relates to an improved vehicle propulsion system employing a free piston engine-pump.

BACKGROUND OF THE INVENTION

This invention relates to a stored energy system used for the propulsion of a motor vehicle, and in particular to a system wherein the prime mover constitutes a free piston engine-pump. Such stored energy system typically uses an energy accumulator which acts to decouple the instantaneous power applied to the wheels from the power developed by the prime mover. Such energy accumulator is typically a pneumatically pressured hydraulic accumulator. Such stored energy propulsion system is illustrated in FIG. 1 hereof (see also Applicant's U.S. Pat. No. 4,087,205). In this prior art system, pressurized fluid output from the free piston engine-pump unit is supplied through appropriate circuitry to a hydraulic motor (such as a swash-plate motor) which in turn drives the vehicle wheels such as through an appropriate change-speed gear arrangement. The fluid circuitry which couples the output of the engine-pump to the hydraulic motor typically incorporates a large-capacity accumulator for absorbing flow pressure energy during the normal or steady-state operation of the vehicle, and for adding energy back into the system when the vehicle demands high engine power levels for shorter periods of time, whereby the power capacity of the prime mover (i.e., the free piston engine-pump) can be sized more closely to meet the steady-state demand rather than the maximum peak demand.

With this known system, however, wherein only a large-capacity accumulator is employed, the ability to modulate the working pressure as supplied to the drive motor, in response to power demand, is restricted in that any significant pressure modulation can generally be accomplished only over a rather long time interval such as in the order of several seconds inasmuch as the large capacity of the accumulator necessarily results in substantial inertia which prevents rapid pressure changes or fluctuations over short time intervals.

Accordingly, the present invention relates to a stored energy-type propulsion system for a vehicle, specifically a system employing a free piston engine-pump, which system has the capability of responding to peak power demands by using a large-capacity accumulator such as exists in the prior art systems, but which improved system also has the capacity of responding to sudden changes in power demand such as changes which demand a sudden pressure increase in the system within an extremely small time interval such as in the order of about 0.1 second, particularly when such power demand occurs during operation of the vehicle under such conditions that the power demand is still significantly less than the peak power demand requirement. This improved system hence overcomes disadvantages associated with the prior art system in providing increased engine performance and responsiveness under substantially all driving conditions.

In the improved stored energy propulsion system of this invention, the free piston engine-pump is of the double-acting type and functions as the prime mover, and is hydraulically connected to the drive motor for the vehicle, which drive motor in the conventional manner is responsive to the vehicle demand as controlled by the vehicle accelerator pedal. The hydraulic connection between the engine-pump and the drive motor includes a large-capacity pressure accumulator. This accumulator is controlled by valving which is maintained closed under normal operating and steady-state operating conditions of the vehicle to maintain pressure in this accumulator at close to the maximum pressure operating level (such as about 5000 psi) of the system. The valving to this large accumulator is opened only in response to a signal which senses that the vehicle, when operating at a normal state, has demanded substantially peak capacity such as due to the vehicle encountering a steep hill or the driver under a highway condition pressing the accelerator suddenly down to almost the full extent to permit sudden passing of another vehicle. Under such condition, the large accumulator is permitted to communicate with and supply stored high-pressure fluid into the system to provide additional driving power to the drive motor, whereby the engine-pump will continue to operate at its steady-state level and, after the engine returns to its steady-state level, the valving will again close off the large accumulator except that it does function in a manner equivalent to a one-way check valve so as to permit recharging of the large accumulator. In addition, the hydraulic system which connects between the engine-pump and the drive motor also has an auxiliary small-capacity pressure accumulator connected in fluid communication therewith. This auxiliary accumulator has a size which is very small in relationship to the large accumulator such as in the neighborhood of between about 0.1 to about 0.05 the capacity of the large accumulator. This auxiliary accumulator has valving associated therewith which is normally open so that this accumulator is normally in continuous communication with the main pressure system to effectively act as a cushion so as to minimize pressure pulses due to cyclic operation of the engine-pump. In addition, the engine-pump is preferably operated in an ON-OFF system cycle which results in the engine-pump being operated for a selected number of cycles (such as about 10 or more cycles over a time interval of about 1 second, for example) during the ON part of the system cycle, followed by the engine-pump being stopped for an equivalent time duration during the OFF part of the system cycle, and during this OFF part of the system cycle the auxiliary accumulator supplies pressure fluid into the system for driving the drive motor. In addition, when the engine has need for a sudden pressure increase of short duration due to sudden depression of the accelerator pedal, then a signal closes off the valve of the auxiliary accumulator whereby it is effectively isolated from the system, and hence the pressure in the system can suddenly increase (such as over a short time interval of about 0.01 second) due to the operation of the engine-pump and specifically its excess capacity, thereby providing a substantially instantaneous increase in the power output of the driving motor. The auxiliary accumulator preferably remains in constant communication with the hydraulic system through a small orifice which permits pressure fluid to be supplied to the auxiliary accumulator but does not interfere with the sudden pressure increase within the hydraulic system. As soon as this sudden demand for power is eliminated, such as the vehicle returning to its normal or steady state, then the signal to this latter valve is changed and permits the valve to reopen. The auxiliary accumulator thus returns to the performance of its normal functions of cushioning the pressure pulses within the system during the ON part of the system cycle and supplying pressure fluid to the drive motor during the OFF part of the system cycle. With this arrangement, the pressure buildup in the system through use of the auxiliary accumulator can occur within a short time interval, such as a maximum time interval of about 1 second, which speed of response is not possible with the large accumulator. The large accumulator remains isolated from the system and becomes operative only when peak power is demanded.

Other objects and purposes of the invention will be apparent to persons familiar with systems of the above type upon reading the following specification and inspecting the accompanying drawings.

BRIEF DESCRIPTION OF THE DRAWINGS

FIG. 1 diagrammatically illustrates a prior-art stored energy propulsion system.

FIG. 2 illustrates a prior-art free piston engine-pump.

Figure 3:
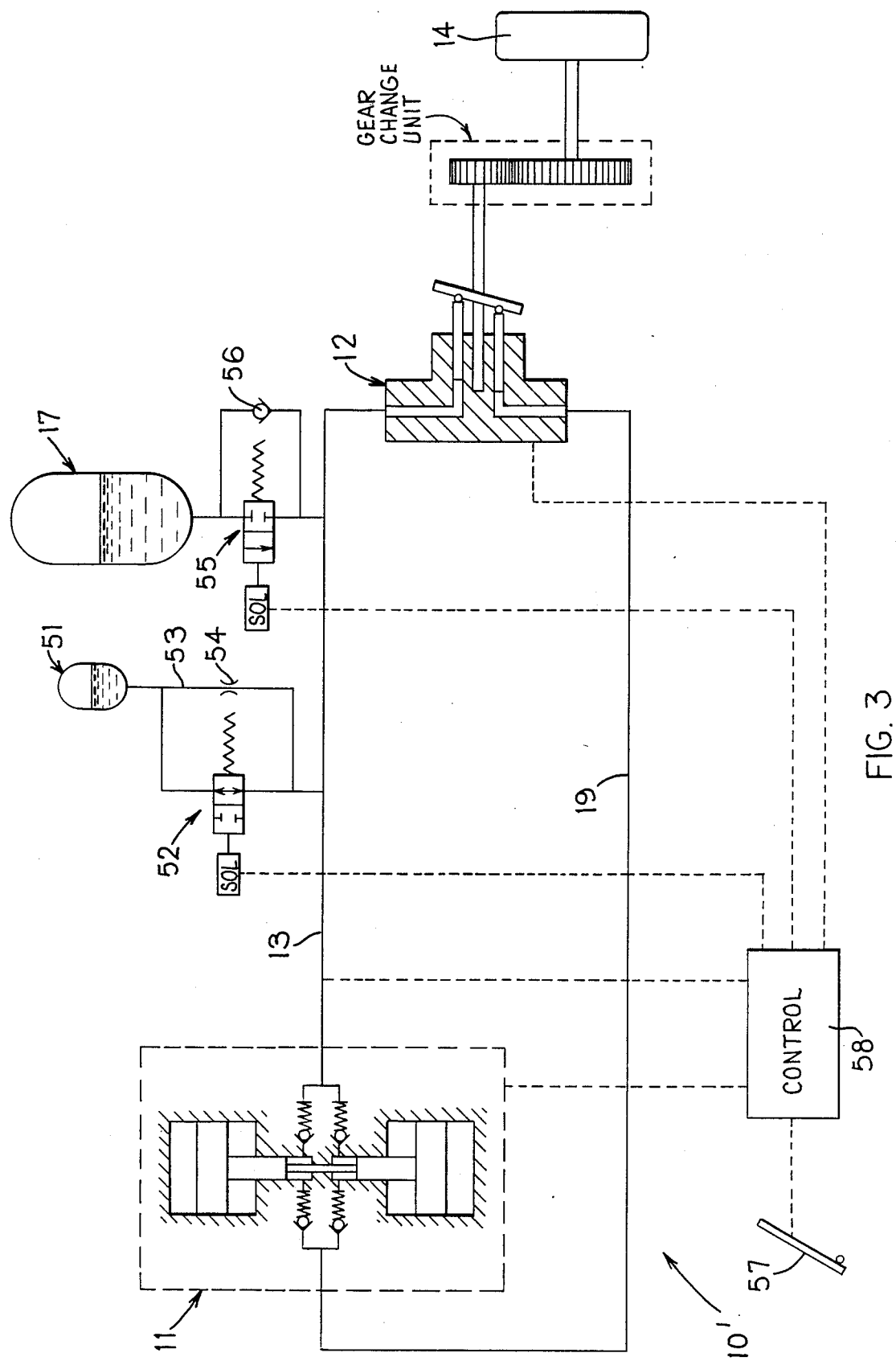
FIG. 3 illustrates the improved propulsion system of the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

FIG. 1 diagrammatically illustrates a known stored energy accumulation system 10 which includes a power unit 11, specifically a free piston engine-pump unit, connected to a variable displacement hydraulic motor 12 of conventional design via a hydraulic supply passage 13. The motor 12 is controlled by the driver's throttle, (i.e., the accelerator pedal) and is drivingly connected to the vehicle wheels 14, preferably through a suitable change-speed gear unit. The motor 12 has a suitable control unit 15 associated therewith, which is connected to the vehicle throttle, and a further control unit 16 is connected to the vehicle prime mover 11. A conventional large-capacity high-pressure accumulator 17 is connected to the pressure supply conduit 13 for storing pressurized working fluid therein. A further low-pressure accumulator 18 connects to the return passage 19 for also storing pressure fluid therein.

Referring to FIG. 2, the engine-pump unit 11 comprises a double-acting free piston engine-pump having a housing 21 slidably supporting therein a reciprocating piston unit 22 which includes a pair of opposed power pistons 23 and 24 slidably disposed within bores 25 and 26, respectively. Combustion chambers 27 and 28 are formed within the bores between the housing and the opposed end wall of the respective piston. An inlet 29, an exhaust 31 and a conventional fuel supply such as fuel injector 32 is disposed for communication in a conventional manner with each of the combustion chambers.

The power piston respectively have pump pistons 33 and 34 fixedly connected thereto, which pump pistons are of smaller diameter and project inwardly from the power pistons in opposed relationship to one another for coaxial alignment. The pump pistons are slidably supported within bores 35 and 36 so that pumping chambers 37 and 38 are formed adjacent the inner ends of the respective pump pistons. The pump pistons are additionally fixedly interconnected by an intermediate rod 39 so that the power and pump piston reciprocate as a unit.

The pumping chambers communicate with passages 41 and 42 which have one-way check valves 43 associated therewith, and these passages interconnect to the return or low-pressure passage 19. Further passages 44 and 45 function as outputs and also communicate with the pumping chambers, these latter passages each having a one-way check valve 46 associated therewith so that these passages can thence communicate with the high-pressure passage 13.

The overall arrangement illustrated by FIGS. 1 and 2 is explained in greater detail in Applicant's aforementioned U.S. Pat. No. 4,087,205.

Referring now to FIG. 3, there is illustrated the improved stored energy propulsion system 10' of the present invention. This improved system 10' incorporates therein many of the same features of the prior art system 10 illustrated by FIG. 1, which features are designated by the same reference numeral whereby further detailed description of these features is omitted.

The improved system 10' includes an auxiliary accumulator 51 connected to the high-pressure passage 13, which accumulator 51 is like the large-capacity high-pressure accumulator 17 in that it is of conventional construction having therein a variable volume of hydraulic fluid maintained under pressure by a confined quantity of pressurized gas (normally air). This auxiliary accumulator is preferably connected to the high-pressure passage 13 at a location upstream of the large accumulator 17, and in fact is preferably connected to the high-pressure passage 13 at a location disposed closely adjacent the discharge from the engine-pump 11.

Communication between the auxiliary accumulator 51 and the passage 13 is controlled by a valve arrangement 52 which is normally maintained in an opened condition to permit free communication between the auxiliary accumulator 51 and the passage 13. This valve arrangement 52, in the illustrated embodiment, normally has its valve element spring urged into the opened position, with the valve having a suitable solenoid or other standard operator for shifting the valve to a closed position in response to an appropriate control signal, as explained below.

In addition, a parallel passage 53 bypasses the valve 52 and has a small-diameter orifice or restriction 54 associated therewith for permitting a very restricted communication between the auxiliary accumulator 51 and the passage 13 even with the valve 52 is closed.

With respect to the large-capacity accumulator 17, its communication with the high-pressure passage 13 is controlled by a valve arrangement 55 which is normally maintained closed so as to normally isolate the large accumulator 17 from the high-pressure passage 13. This valve arrangement 55 is movable into an opened position so as to permit accumulator 17 to communicate with passage 13 by means of a suitable operator, such as a solenoid, which operator is actuated only in response to selected control signals which are generated under selected vehicle operating conditions.

However, the overall valving arrangement to accumulator 17 preferably does include a one-way check valve 56 which permits flow of pressure fluid from passage 13 into the accumulator to permit recharging of the accumulator when necessary, but does not permit flow in the reverse direction.

Auxiliary accumulator 51 is provided with a fluid capacity substantially smaller than that of the accumulator 17. For example, the large-capacity accumulator 17 preferably has a fluid capacity which is in the order of at least about 10 to 20 times greater than the fluid capacity of the auxiliary accumulator 51. This small size of the auxiliary accumulator 51 is selected so that the accumulator 51, due to its continuous communication with passage 13 under normal operating conditions, is able to effectively absorb or cushion the pressure variations in passage 13 due to cyclic ON-OFF operation of the engine-pump unit 11. The connection of the auxiliary accumulator 51 to passage 13 closely adjacent the output of the engine-pump unit 11 thus greatly stabilizes and substantially equalizes the pressure in the line 13 as supplied to the drive motor 12 during a steady-state vehicle operation.

The engine-pump unit 11 is sized so as to be capable of producing a maximum pressure which substantially corresponds to the maximum usual steady-state highway driving condition of the vehicle, such as the maximum speed limit when coupled with the maximum acceptable grade or incline of an interstate highway. Under such conditions, the unit 11 is capable of providing sufficient quantity and pressure to the motor 12 to effect satisfactory driving of the vehicle. However, if the driver imposes on the vehicle a condition which exceeds this capability, as by effecting a sudden full depression of the accelerator pedal 57, then this is sensed by an appropriate control 58 and results in a signal being sent to the motor 12 demanding increased higher pressure and output, which pressure is greater than the pressure output of the engine-pump unit 11 (the latter pressure being sensed by the control unit by sensing the pressure in the passage 13). When this pressure differential between the demand pressure at the pump 12 exceeds the supply pressure in passage 13 by a predetermined differential amount, then the control 58 sends a signal to the valve 55 which causes the latter to open so that the large-capacity high-pressure reservoir of hydraulic fluid in the accumulator 17 communicates with the supply line 13. In this manner, the necessary pressure can be supplied to the pump 12 so as to provide for peak power under these demand conditions (such as an excessively steep hill, or a very sudden passing at full highway speed) When the demand for peak power subsides, then the control unit terminates the signal to the valve 15 so that it returns to its closed position. Upon returning to the steady-state condition, the engine-pump unit 11 has sufficient excess capacity as to permit recharging of the accumulator 17, such as through the one-way valve 56. The accumulator 17 is hence opened only when the vehicle propulsion system 10' is operating at close to its peak steady-state condition and, under lesser operating conditions, the control unit senses a lower operating pressure and does not open the accumulator 17, even though sudden depression of the accelerator pedal may call for a pressure increase.

As to the auxiliary accumulator 51, it is in continuous communication with the passage 13 throughout substantially all normal vehicle operating conditions. Due to its small capacity, the accumulator 51 is able to respond to and effectively cushion the pressure variations in this passage 13 due to the cyclic nature of the engine-pump. However, if the driver desires to change the engine torque at a very high rate, such as pushing the accelerator pedal substantially to the floor either from a stopped condition or from a slow vehicle speed condition, which condition may result in the pedal being depressed in about 0.1 second, then the control unit responds to the accelerated pedal position and transmits a signal to the drive motor 12 indicating a demand for a pressure which is substantially greater than that being sensed in the pump output passage 13. The control unit, on sensing this sudden pressure differential in excess of a predetermined magnitude, hence transmits a signal which immediately closes the valve 52 to the auxiliary accumulator 51 which either isolates the accumulator 51 or, in the illustrated embodiment, permits a very restricted flow into the accumulator 51 through the orifice 54. This has the effect of significantly increasing the rate at which the pressure within the passage 13, as supplied to the motor 12, can be increased to thus rapidly and timely respond to the driver's request for power as caused by depression of the accelerator pedal 57. When this increased power demand is terminated due to the pressure in passage 13 and the demand at motor 12 being substantially balanced, then the control unit terminates the signal to the valve 52 so that it again opens and permits the accumulator 51 to again communicate with passage 13 so as to minimize pressure fluctuations therein. However, during the time interval when the valve 52 was closed, the orifice 54 still permits limited flow into the accumulator 51 to effect pressure buildup therein in response to the increase in pressure within the passage 13 of the system.

The control 58 can obviously assume many forms and configurations, but preferably constitutes a combination of hardware and software (such as a microprocessor) so as to analyze the various conditions and transmit the various control signals in accordance with originally programmed conditions which reflect the desired operating conditions of the system in accordance with the nature of the vehicle.

Operation: The engine-pump 11 is regulated by the control 58 to operate in an ON-OFF manner, with the auxiliary accumulator 51 being charged during the "ON" part of the system cycle, and with this accumulator 51 supplying pressure fluid to the system for driving the motor during the "OFF" part of the system cycle. For example, during the "ON" part of the system cycle, the engine-pump is operated for a limited time during which it carries out a small number of complete pumping cycles, such as in the order of 10 to 100 cycles depending upon the operational rate of the engine-pump. During this "ON" part of the operational (i.e., system) cycle, which "ON" part may occur over a time period of about 1 second, the quantity of pressurized fluid supplied from the pump into the system exceeds the demand of the drive motor 12, and hence some of the pressurized fluid is supplied into the auxiliary accumulator 51 so as to charge same. Upon sensing a predetermined desired pressure, the control 58 shuts off the engine-pump 11, and initiates the "OFF" part of the system cycle. During this "OFF" part of the system cycle, the pressure fluid stored in the auxiliary accumulator 51 is resupplied to the passage 13 to drive the motor 12. This accumulator 51 is preferably sized to permit driving of the motor 12 for about 1 second under a steady-state condition while the engine-pump 11 is shut down. When the control senses a sufficient pressure decline (such as about a 200 psi decline) in the passage 13, then the engine-pump 11 is activated to switch back to the "ON" part of the operational cycle. In this manner, the engine-pump 11 and the auxiliary accumulator 51 alternatively cooperate in a cyclic manner to supply pressure fluid to the drive motor 12. At the same time, the accumulator 51 is able to effectively cushion or smooth out pressure pulsations during the ON part of the system cycle to an acceptable level for driving the drive motor 12 even though the engine-pump 11 is run for a large number of pumping cycles and then is stopped for a time interval equivalent to the large number of pumping cycles. The cushioning of the pressure pulses due to the cyclic operational nature of the engine-pump during the ON cycle part eliminates problems of vibration or resonance which could otherwise be transmitted to the system so as to potentially have undesirable structural or functional effects.

If, during the operation explained above, the driver suddenly depresses the accelerator pedal so as to indicate a demand for substantially increased output power, then the control senses this demand by sensing the substantial disparity between the demand at the pump and the flow to the pump, and hence immediately activates or maintains the activation of the engine-pump 11, and also immediately closes the valve 52 to isolate the accumulator 51 from the passage 13. With the accumulator 51 isolated from the system, and due to the normal excess capacity of pressure fluid discharged from the pump into the passage 13, this results in a substantially immediate increase in the pressure fluid which can be supplied to the drive motor 12 to permit a substantially instantaneous increase in power, thereby permitting a response to a sudden accelerator depression which may occur over a time interval in the order of about 0.1 second.

During the aforementioned operation, the large-capacity accumulator 17 is effectively isolated from the system due to the closure of the valve 55, although excess pressure in the system acting through the check valve 56 does permit this accumulator 17 to remain charged at maximum system pressure. The valve 55, on the other hand, is opened so as to permit accumulator 17 to communicate with passage 13 only when the control 58 senses a particular type of peak power demand as previously explained. When the valve 55 is opened under such condition, then the substantially larger capacity of this accumulator 17 hence enables pressure fluid therein to be supplied to the passage 13 so as to the drive motor over a substantial period of time which may be of the order of about 15 seconds so that this pressure fluid from the accumulator 17 combines with the pressure fluid from the engine-pump to permit driving of the motor 12 at the peak power condition.

Attention is directed to Applicant's paper published by the American Institute of Aeronautics and Astronautics on Aug. 10, 1987, Paper No. 879021, entitled "Free Piston Engine-Pump/Hydrostatic Motor Control Concepts". A copy of this paper is enclosed, and the disclosure thereof, in its entirety, is incorporated herein by reference. This latter paper illustrates and describes the operation of such stored energy propulsion system, and the control therefor, in greater detail.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A stored energy vehicle propulsion system, comprising:

a prime mover comprising a double-acting free piston engine-pump having an output to which is supplied a pressurized hydraulic fluid;

hydraulic motor means driven by said hydraulic fluid for effecting rotational driving of vehicle wheels;

passage means communicating between said engine-pump and said motor means for transmitting pressurized hydraulic fluid from said engine-pump to said motor means;

first pressure-type accumulator means connectable in fluid communication with said passage means for storing said hydraulic fluid therein at a relatively high pressure which approximately corresponds to the maximum operating pressure of said hydraulic motor means, said first accumulator means having a first capacity for said hydraulic fluid;

first valve means for controlling flow of hydraulic fluid between said first accumulator means and said passage means, said first valve means being normally maintained in a closed position preventing flow of pressurized hydraulic fluid from said first accumulator means into said passage means except when the pressure in said passage means is at a relatively high steady-state pressure and said motor means demands a sudden increase in pressure;

second accumulator means connectable to said passage means for storing a quantity of said hydraulic pressure fluid therein at a pressure level which normally approximately corresponds to the pressure level in said passage means, said second accumulator means having a capacity which is normally at least no more than one-tenth the capacity of said first accumulator means; and second valve means for controlling flow of hydraulic fluid between said second accumulator means and said passage means, said second valve means being normally maintained opened so as to cushion normal pressure variations of the hydraulic fluid within said passage means, said second valve means being closed in response to the pressure level demanded by the motor means exceeding the system pressure by a predetermined differential so as to isolate said second accumulator means from said passage means to permit rapid increase of pressure within said passage means.

2. A system according to claim 1, including a bypass passage providing continuous communication between said passage means and said second accumulator means, said bypass passage having small orifice means therein for significantly restricting flow of hydraulic fluid therethrough into said second accumulator means.

* * * * *

UNITED STATES PATENT AND TRADEMARK OFFICE
CERTIFICATE OF CORRECTION

PATENT NO. : 4 891 941
DATED      : January 9, 1990
INVENTOR(S): Richard P. Heintz It is certified that error appears in the above-identified patent and that said Letters Patent is hereby corrected as shown below:

On the title page please correct the issue date to read ---January 9, 1990---.

Signed and Sealed this

Eleventh Day of December, 1990

Attest:

HARRY F. MANBECK, JR.

*Attesting Officer*     *Commissioner of Patents and Trademarks*